United States Patent Office 3,473,293
Patented Oct. 21, 1969

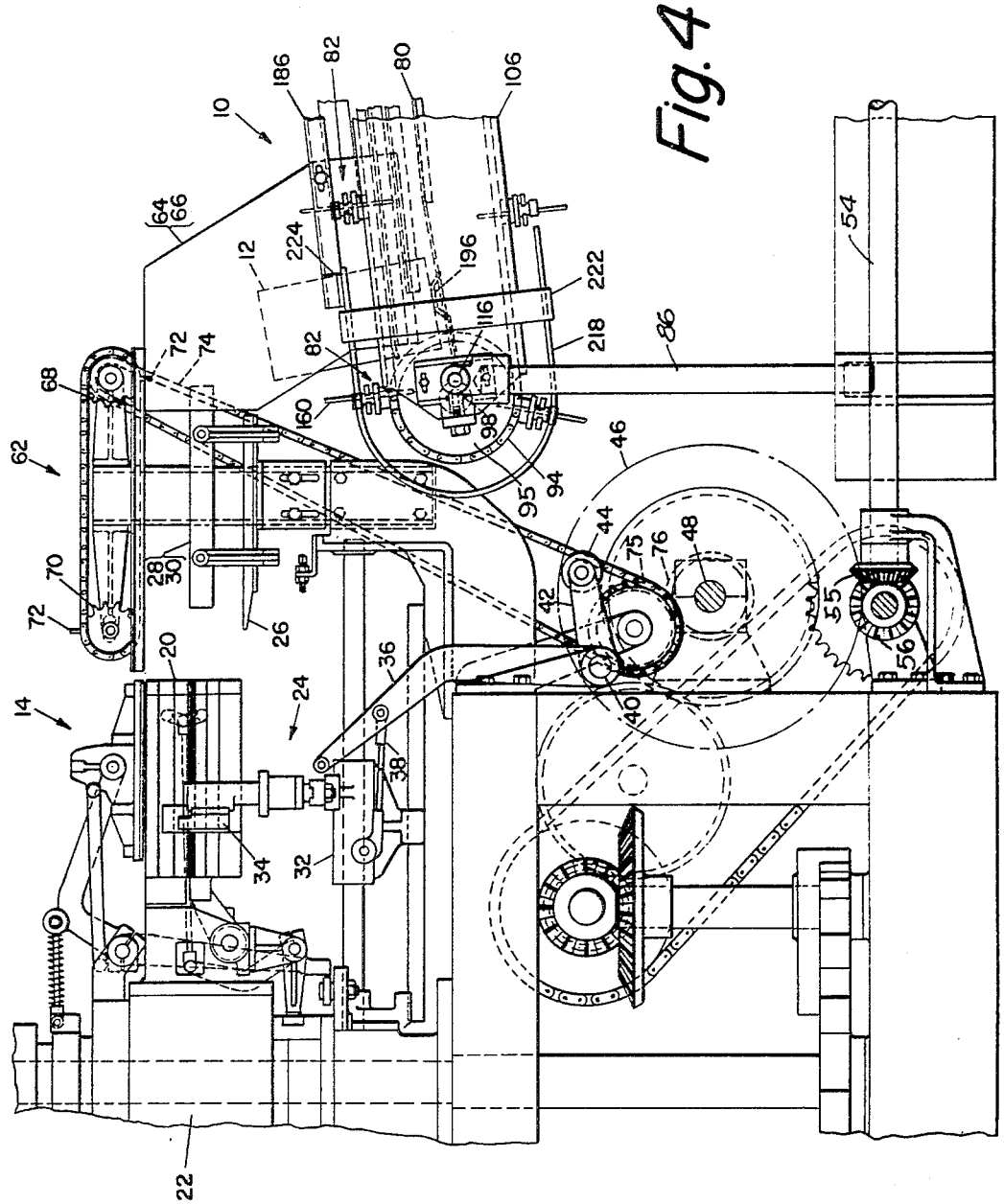

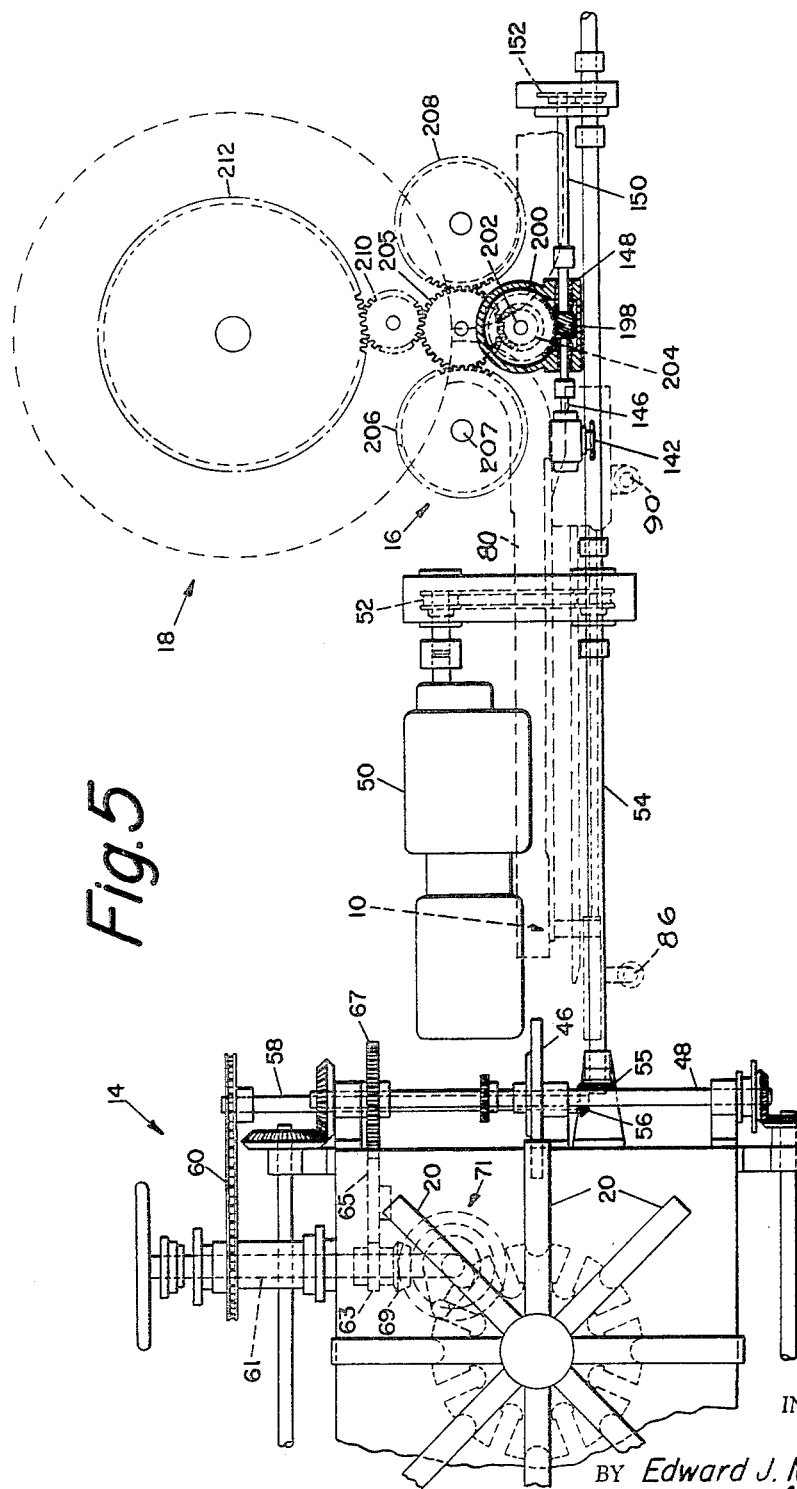

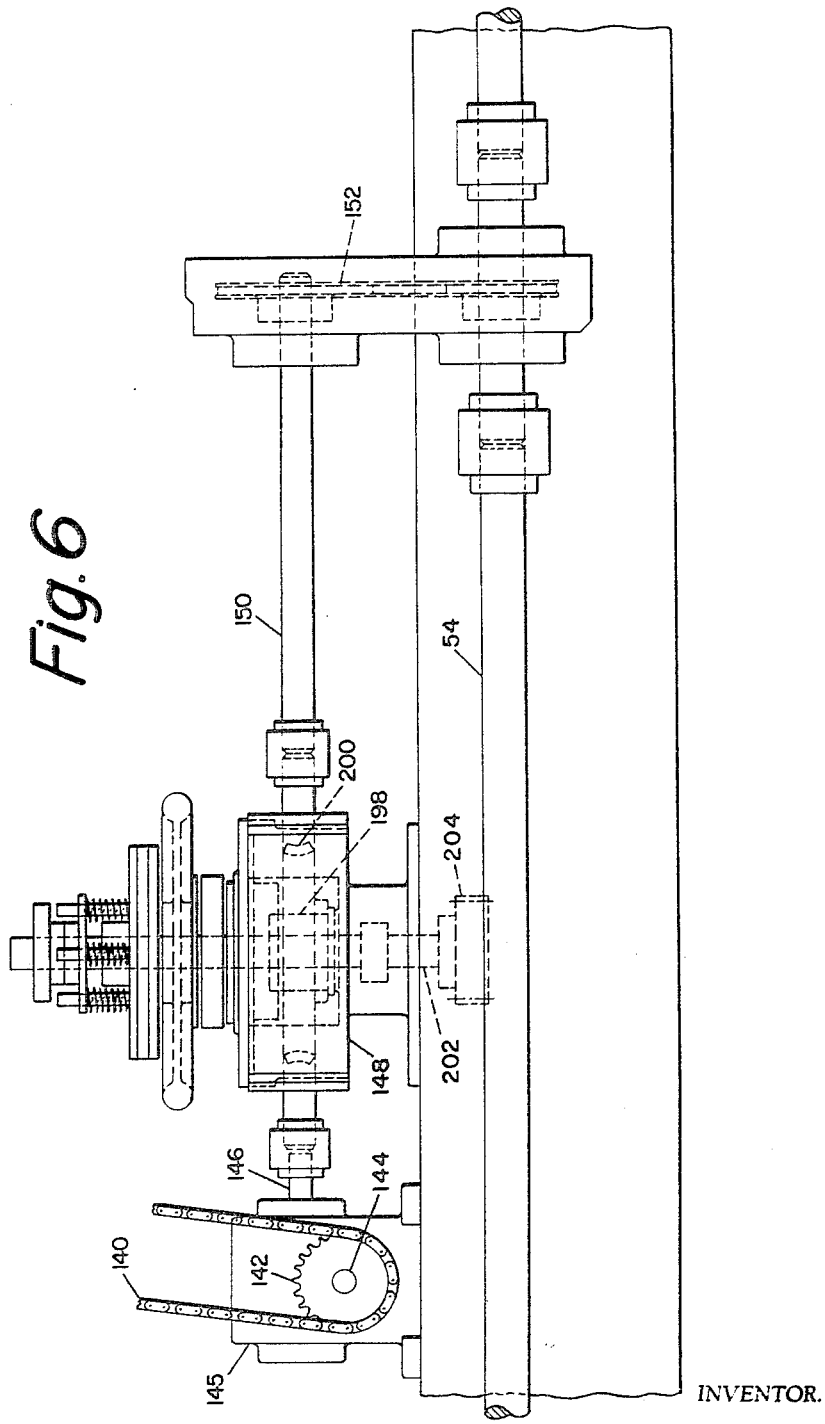

3,473,293
APPARATUS FOR HANDLING FLEXIBLE BAGS
Edward J. McCarthy, Braintree, Mass., assignor to Pneumatic Scale Corporation, Quincy, Mass., a corporation of Massachusetts
Filed June 9, 1966, Ser. No. 556,406
Int. Cl. B65b 43/48, 1/00
U.S. Cl. 53—183                    7 Claims

ABSTRACT OF THE DISCLOSURE

A conveyer adapted for use in a continuous production line for transferring containers in predetermined and accurately spaced relation from one machine to a second machine and in synchronized relation to the operation of the continuous production line.

---

This invention relates to apparatus for handling flexible bags in a continuous production line, and more particularly, to apparatus arranged to receive successive bags from one machine and to deliver the bags in predetermined spaced relation to a second machine.

Prior to the present invention, successive containers produced by one machine and discharged onto an intermediate conveyer for delivery to another machine were permitted to come together in a contiguous line on the conveyer to form a reservoir thereof from which successive foremost containers were separated from the line and transferred to the second machine in timed relation to the operation of the second machine. This expedient was found satisfactory when handling relatively rigid cardboard cartons produced on a carton forming machine and conveyed by a continuously moving belt conveyer to a carton filling machine. However, when handling relatively lightweight flexible bags in this manner, it was found that the bags were difficult to handle when aligned in contiguous relation because of their relatively light weight since they might slip on the belt and crush together under the pressure of succeeding bags in the line. Also, separation of successive foremost bags in the line was rendered difficult because of the flexible lightweight character of the bags and because of slippage of the bags on the belt conveyer.

Accordingly, it is an object of the present invention to provide novel apparatus for positively controlling the movement of the bags during the passage thereof from one machine in a continuous production line to a succeeding machine in the line in a manner such that the bags may be maintained in predetermined accurately spaced relation out of contact with each other during their progress from one machine to another and in synchronized relation to the operation of the continuous production line.

Another object of the invention is to provide a novel and improved conveyor arranged to convey successive relatively lightweight flexible bags from one machine in a continuous production line to another machine in predetermined spaced relation and wherein the conveyor is synchronized with relation to the operation of the machines to enable transfer of successive continuously moving bags directly into the second machine.

With these general objects in view and such others as may hereinafter appear, the invention consists in the bag handling apparatus and in the various structures, arrangements and combinations of parts hereinatfer described and particularly defined in the claims at the end of this specification.

In the drawings illustrating the preferred embodiment of the invention:

FIG. 4 is a side elevation of a portion of a bag forming machine including mechanism for transferring successive bags produced thereon onto the present conveyor;

FIG. 5 is a plan view of the drive mechanism connecting the bag forming machine; conveyor; and bag filling machines; and FIG. 6 is a side elevation of that portion of the drive mechanism from which the conveyor is driven.

Figure 1:
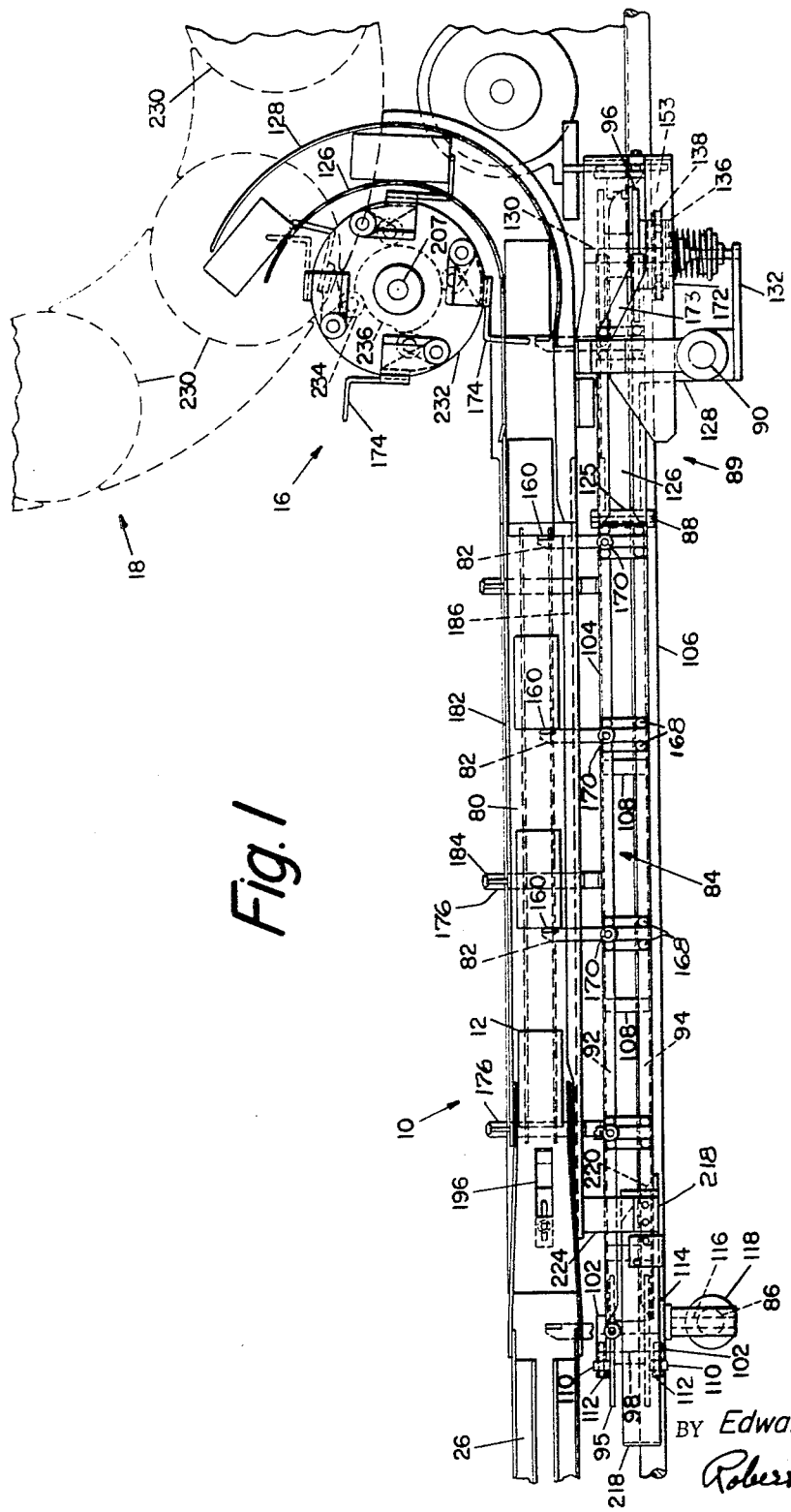
FIG. 1 is a plan view of a synchronized conveyor embodying the present invention showing portions of a bag forming machine and a bag filling machine between which the conveyor extends.

Referring now to the drawings, the conveyor indicated generally at 10 is arranged to receive successive bags 12 discharged from a bag forming machine, a portion of which is shown generally at 14 in FIG. 4, and to deliver the bags in spaced relation to the intake spider 16 of a bag filling machine, a portion of which is indicated generally at 18.

In general, the bag forming machines may comprise a machine of the type shown in the United States patents to John G. Vergobbi, Nos. 2,533,642 and 2,364,406, which are arranged to form a bag on a horizontal forming block from which the formed bag is stripped at a discharge station and transferred to a conveyer in an upright position. As illustrated in FIG. 4, the bag forming machine is provided with a plurality of horizontal radially extended forming blocks 20, only one of which is shown, and which are carried by a central intermittentily rotated spider 22. In operation, the formed bag is removed from the forming block 20 by a stripping mechanism indicated generally at 24 and which is arranged to transfer the bag onto a stationary support 26 and between guide rails 28, 30.

The stripping mechanism 24 includes a reciprocable unit 32 which carries stripping elements 34 and the unit is arranged to be reciprocated by cam operated linkage including an arm 36 connected by a link 38 to the reciprocable unit 32. The arm 36 is carried by a shaft 40 and a second arm 42 also carried by the shaft is provided with a cam roll 44 for cooperation with a cam 46 fast on a cam shaft 48 forming a part of the bag forming machine. As illustrated in FIG. 5, the drive to the cam shaft 48 includes a motor 50 and driving connections including a chain and sprocket drive 52, line shaft 54 and miter gears 55, 56 to a lower shaft 58. The lower shaft 58 is connected by a chain and sprocket drive 60 to a hand wheel shaft 61 having a pinion 63 connected by a train of gears 65 to a gear 67 fast on the cam shaft 48. The shaft 61 is also provided with a bevel gear pinion 69 connected to drive the Geneva mechanism indicated generally at 71 for driving the intermittently operated forming blocks 20.

The bag 12 stripped from the block 20 and at rest on the support 26 is arranged to be advanced along the support by a chain conveyor indicated generally at 62 disposed above the bag. The bag thus advanced is arranged to drop off the outer end of the support to tip downwardly by gravity closed end first, between guide rails 64, 66 to fall in a substantially upright position onto the conveyor 10 disposed therebelow. As herein shown, the chain conveyor 62 is arranged to run over sprockets 68, 70 and is provided with lugs 72 arranged to engage the trailing end of successive bags deposited onto the support 26. The chain conveyor is driven in timed relation to the bag forming machine through driving connections including a chain drive 74 connected by gears 75, 76 to the cam shaft 48.

Figure 2:
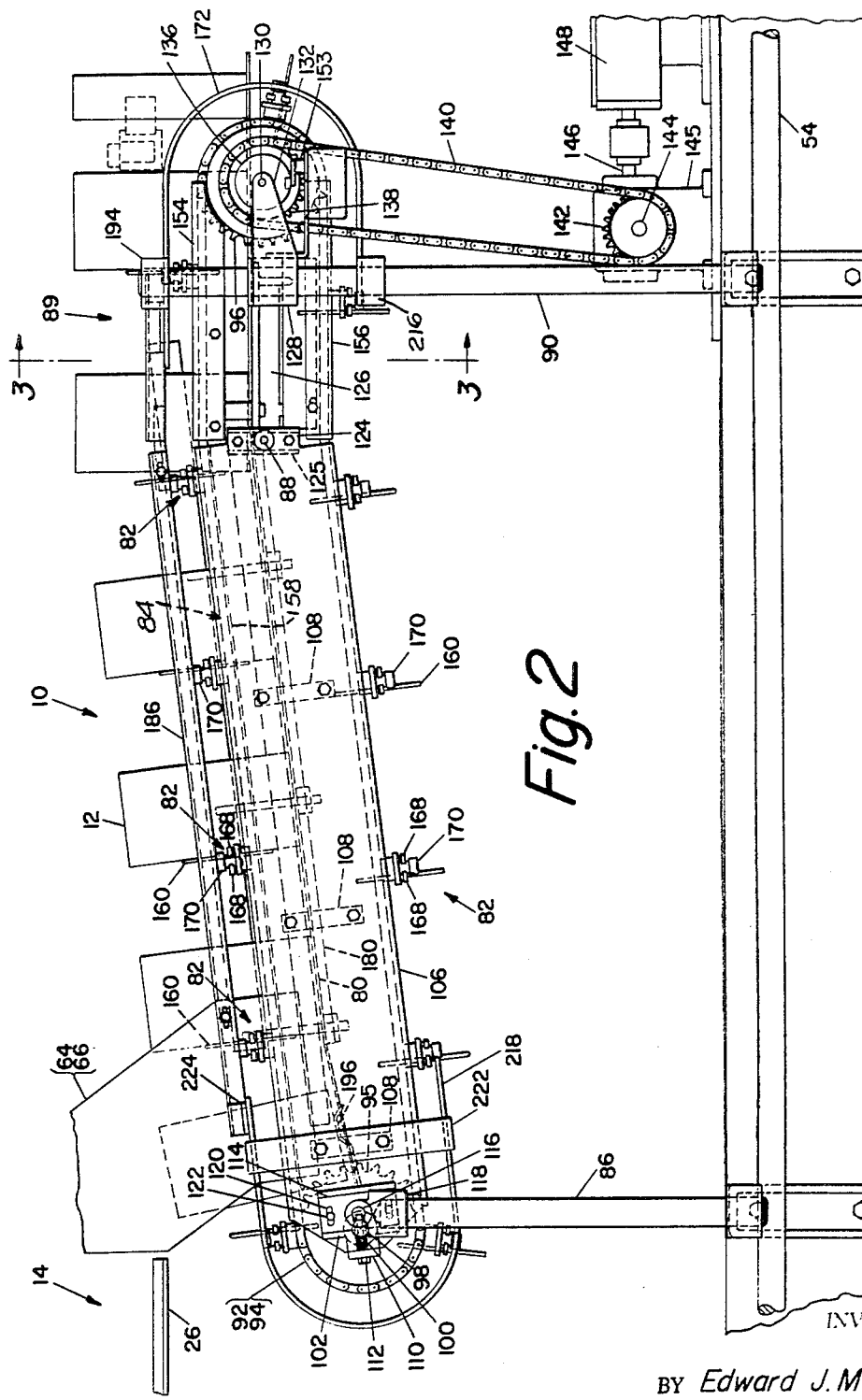
FIG. 2 is a side elevation of the conveyor shown in FIG. 1.

Referring now to FIGS. 1 and 2, the conveyor 10 includes a stationary elongated plate 80 along which successive bags are advanced in spaced relation by spaced pusher elements 82 carried by and extended from a separate parallel chain conveyor indicated generally at 84. As herein shown, the receiving end of the conveyor is supported from an upright post 86 at a suitable level below the stationary support 26 to permit the bag to assume an upright position thereon when the bag is advanced by the conveyor 62 and tipped downwardly onto the conveyor 10. The conveyor 10 is inclined upwardly from the receiving end thereof to a pivotal point comprising a stud 88, the remainder of the conveyor 10 indicated generally at 89 being supported in a horizontal position from an upright post 90 at a level to conform to the level of the intake spider 16 of the bag filling machine 18.

The chain conveyor 84 includes a pair of spaced chains 92, 94 arranged to run over a double sprocket 95 at the receiving end and over a double sprocket 96 at the delivery end of the conveyor. The double sprocket 95 is supported for rotation on an idler shaft 98. The shaft 98 is provided with opposed flats at each end to fit into slots 100 in plates 102 carried by opposed elongated side brackets 104, 106 which are bent inwardly at their upper and lower edges to serve as chain tracks. The side brackets 104, 106 are connected by tie pieces 108, and the plates 102 are provided with bars 110 adjacent the open ends of the slots and through which adjusting screws 112 extend for threaded engagement with the flattened portions of the idler shaft 98. Thus, in operation, tightening of the adjusting screws 112 draws the shaft along the slot to serve as a chain tightener. The side bracket 106 is supported at the receiving end of the conveyor by a plate 114 mounted on a stud 116 carried by a cap member 118 secured to the upper end of the post 86, the side bracket 104 being supported from the bracket 106 by the tie pieces 108. The plate 114 is provided with slots 120 to receive bolts 122 in threaded engagement with its adjacent bracket plate 102 for angular adjustment of the conveyer during assembly.

The pivotal ends of the side brackets 104, 106 are likewise provided with plates 124 through which the pivot stud 88 extends, the stud being supported at the end portion 125 of one arm 126 of a bracket, the second arm 128 of the bracket being supported on the upright post 90. The plates 124 are likewise provided with slots and bolts for cooperation with threaded openings in the end portion 125 of the bracket for initial angular adjustment of the conveyer.

The double sprocket 96 is mounted on a stationary shaft 130 supported at one end by an arm 132 extended from the bracket arm 128, the other end of the shaft being supported in a frame forming a part of the bag filling machine. The double sprocket 96 is mounted to rotate on the stationary shaft 130 and is connected by a spring pressed ball clutch indicated generally at 136 to a drive sprocket 138 also mounted to rotate on the shaft 130. The sprocket 138 is connected by a chain 140 to a sprocket 142 mounted on the output shaft 144 of a gear reduction unit 145, the input shaft 146 being connected to one side of a gear box 148. A second shaft 150 extending from the other side of the gear box is connected to the main drive or line shaft 54 by a chain and sprocket drive 152 as shown. The spring pressed ball clutch 136 is normally engaged and comprises an overload safety mechanism wherein the ball clutch will become disengaged in the event of an overload such as an inadvertent obstruction to rotation of the double sprocket. When such an overload occurs, the driving element of the clutch will move outwardly against the spring and engage a microswitch 153 incorporated in the motor circuit to stop the machine.

Figure 3:
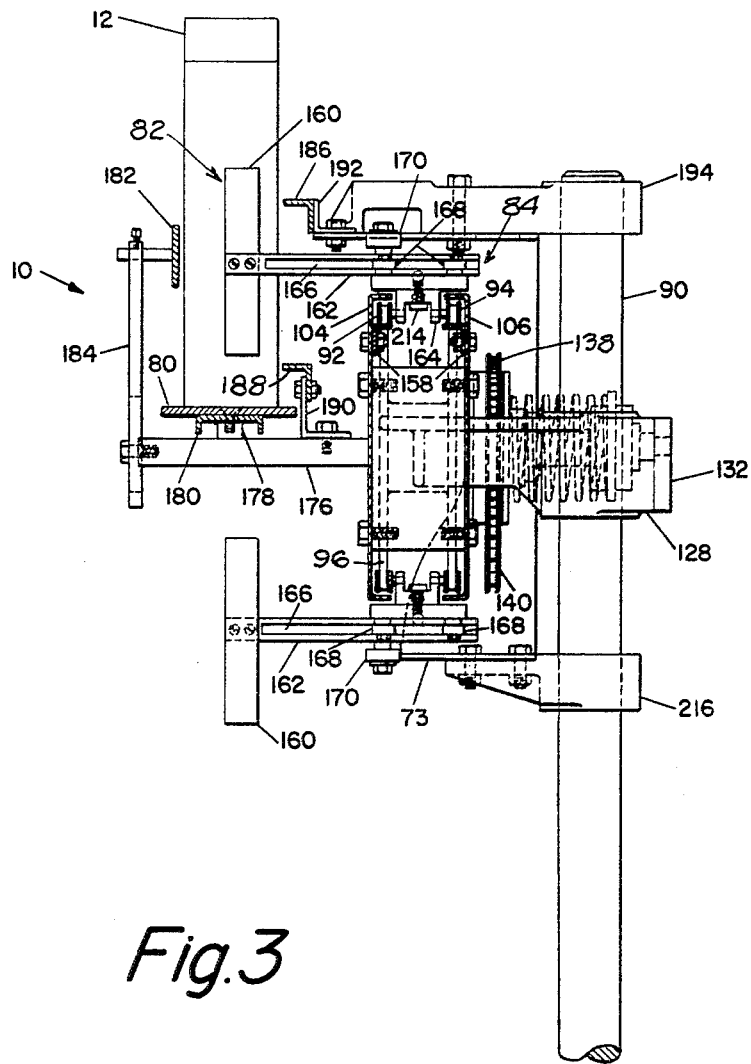
FIG. 3 is a cross sectional view of the conveyor taken on the line 3—3 of FIG. 2.

The horizontal portion 89 of the conveyor 10 is also provided with suitable upper and lower chain track portions 154, 156 respectively. As shown in FIG. 3, the upper portions of the chain track brackets 104, 106 are provided with angle pieces 158 along which the upper runs of the chains are supported. As herein shown, each pusher element 82 includes a vertical pusher plate 160 carried by a horizontally extended arm 162 mounted for sliding retraction and extension in a bracket 164 connected between the chains 92, 94. The bracket 164 is provided with grooved portions 166 on opposite sides thereof to receive the edges of guide rolls 168 carried by the bracket 164. The horizontally extended arm 162 is provided with a cam roll 170 extending from its upper surface for cooperation with a stationary cam 172 having a cam path 173 provided at the delivery end of the conveyor for the purpose of retracting the pusher elements 82 when the bags arrive at a point relative to the intake spider 16 where successive bags are engaged by rotary transfer arms 174 forming a part of the intake spider 16.

From the description thus far it will be seen that successive bags 12 stripped from the forming blocks 20 of the bag forming machine and deposited on the stationary plate 80 of the conveyer 10 are advanced along the plate in spaced relation by the pusher elements 82 in their extended positions which are arranged to present the bags into operative position to be received by the intake spider 16 of the bag filling machine. As shown in FIG. 3, the plate 80 is supported from the chain conveyer 84 by bars 176 secured to and extended laterally from the side bracket 104. A longitudinally extended bar 178 mounted on the bars 176 carries a U-shaped support 180 on which the plate 80 is attached. The bags are guided along the plate by an outer guide rail 182 carried by upright members 184 secured to the support bars 176, and by upper and lower inner guide rails 186, 188, respectively, the lower guide 188 being attached to angle members 190 secured to the bars 176 and the upper guide 186 being attached to angle members 192 carried by an outboard support 194 attached to the post 90. It will be observed that the receiving end of the conveyer plate 80 is provided with an upwardly offset portion 196 at a point where the bottom of the bag will land when it falls from the support 26. This offset portion 196 was found to be of advantage to protect the formed corners and edges of the relatively lightweight bag since the center portion of the bottom of the bag will take up or absorb the initial landing force of the bag and permit the edges of the bag to fall gently against the plate without damage to such edges.

As illustrated in FIG. 5, the bag filling machine indicated generally at 18 is driven in timed relation to the bag forming machine 14 and conveyer 10 through connections from the main drive or line shaft 54 and through the gear box 148. The driving connections in the gear box 148 include a worm 198 and worm gear 200, the latter being mounted on a shaft 202 which is also provided with a pinion 204. The pinion 204 is in mesh with an intermediate gear 205 which in turn meshes with opposed gears 206 and 208 which drive the intake and delivery spiders respectively of the continuously operated bag filling machine. A third gear 210 in mesh with the intermediate gear 205 is in mesh with a central gear 212 for rotating the filling heads and elevating platforms of the bag filling machine.

The bag filling machine 18 may comprise a vacuum operated filling machine for filling the bags with finely divided materials, such as flour, and may in general comprise a machine of the type illustrated and described in the United States patent to E. J. McCarthy et al., No. 2,847,040, issued Aug. 12, 1958, except that the intermittently operated container intake mechanism shown in the patent is replaced by the continuously rotated intake spider 16 illustrated herein. In operation, when a bag 12 being advanced along the conveyer plate 80 approaches the intake spider 16, its pusher element 82 is retracted by the cam 172 so as to prevent interference of the pusher element with the transfer arm 174 when the latter engages the bag. The slide arm 162 which carries the pusher plate 160 is frictionally retained in either its extended or retracted position by a spring pressed ball unit 214 carried by its bracket 164. The cam 172 is U-shaped, as shown, the upper leg of the U being supported from the bracket 194 and the lower leg of the U being supported from a bracket 216 secured to the post 90. The cam path 173 maintains the slide arm 162 in its retracted position until it reaches a point about halfway around the radius of the upper run, and the cam path is then shaped to return the arm 162 to its extended position as it passes around the remaining half of the radius of the cam into the lower run of the pusher elements in readiness to engage a bag when the same are returned to the upper run. The receiving end of the conveyer 10 is also provided with a U-shaped cam 218 having an inclined path 220, as shown in FIG. 1, arranged to return the pusher element to its extended position in the event that the arm 162 is inadvertently displaced to its retracted position during its progress along the lower run, thus serving as a safety to prevent damage to the parts and assuring that the pusher element will be in its extended position when it again returns to the upper run. The cam 218 is supported at its ends by a bracket 222 secured to an adjacent tie piece 108 of the side brackets 104, 106. A bracket 224 carried by the upper leg of the cam 218 supports one end of the upper guide rail 186 for the bags.

Successive bags engaged by the transfer arms 174 are advanced between curved guide rails 126, 128 in timed relation to the arrival of successive elevating platforms 230 of the bag filling machine and the bags deposited on the platforms are then elevated into operative filling position to their respective vacuum filling heads. As shown in FIG. 1, the transfer arms 174 are pivotally mounted on a disk 232 fast on the intake spider shaft 207, and each arm is provided with a roller 234 for cooperation with a stationary cam 236 supported beneath the disk. The cam 236 is designed to maintain the transfer arms 174 in their bag engaging position until the bag is deposited on its elevating platform 230 whereupon the arm is permitted to rock away from the bag to avoid displacement of the same on its elevating platform during the continuous rotation of the transfer arms and the elevating platforms.

From the above description it will be seen that the present apparatus for handling flexible bags in a continuous production line is enabled to advance successive bags produced by one machine to a second machine in spaced and synchronized relation, thus avoiding the conventional practice of bringing the bags together in contiguous relation to form a reservoir and then separating successive foremost bags in the line for transfer to the second machine.

While the preferred embodiment of the invention has been herein illustrated and described, it will be understood that the invention may be embodied in other forms within the scope of the following claims.

Having thus described the invention, what is claimed is:

1. In apparatus for handling lightweight flexible bags as received from one machine in a continuous production line and delivered to a second machine in the line, in combination, said one machine being intermittently operated and said second machine being continuously operated, an elongated stationary plate arranged to receive successive bags in an upright position as delivered from said intermittently operated machine, and a single continuously moving chain conveyor arranged parallel to said stationary plate and having spaced pusher elements extended into the path of the bags and arranged to advance the bags continuously in predetermined spaced relation along said plate and in timed relation to the operation of said continuously operated machine.

2. Apparatus as defined in claim 1 wherein said one machine comprises a bag forming machine having a plurality of horizontal forming blocks about which the bags are formed and which includes stripping mechanism for removing successive bags from said blocks, a stationary bag support intermediate the stripping mechanism and the receiving end of said elongated plate to which the removed bags are transferred, and means comprising a continuously moving chain disposed above said support and provided with spaced lugs engageable with the trailing ends of successive bags deposited on said support, said chain operating in timed relation to said bag forming machine and to said continuously moving chain conveyor for pushing successive bags off said stationary support to cause the bags to tip downwardly and fall closed end first onto the elongated plate disposed therebelow.

3. In apparatus for handling lightweight, flexible bags as received from one machine in a continuous production line and delivered to a second machine in the line, in combination, an elongated stationary plate arranged to receive successive bags in an upright position as relivered from said first machine, and a continuously moving chain conveyor arranged parallel to said stationary plate and having spaced pusher elements extended into the path of the bags and arranged to advance the bags in pretermined spaced relation along said plate and in timed relation to the operation of said second machine, said one machine comprising a bag forming machine having a plurality of horizontal forming blocks about which the bags are formed and which includes stripping mechanism for removing successive bags from said blocks, a bag support intermediate the stripping mechanism and the receiving end of said elongated plate to which the removed bags are transferred, and means operating in timed relation to said one machine for pushing successive bags off said support to cause the bags to tip downwardly and fall closed end first onto the elongated plate disposed therebelow, said stationary plate being provided with an upwardly offset portion at the receiving end in a position to engage the central portion of the closed end of the bag pushed off said support and tipped to an upright position whereby to protect the corners and edges of the closed end of the bag as it falls onto the plate.

4. Apparatus as defined in claim 1 wherein said second machine comprises a continuously operated machine in which the bags travel in a circular path, a rotary intake spider disposed between the delivery end of said elongated plate and the circular path of said machine for transferring successive bags from the plate to said circular path, said inlet spider being provided with spaced rockingly mounted transfer arms, said pusher elements being mounted for extension and retraction, and means at the delivery end of the chain conveyor for retracting successive pusher elements when the transfer arms engage the bags and for thereafter returning the pusher elements to their extended position.

5. Apparatus as defined in claim 4 wherein the rotary bag filling continuously operated second machine includes means for supporting successive bags transferred thereto by said transfer arms, and means for rocking each transfer arm rearwardly out of the path of its bag after transfer of the latter onto its supporting means.

6. In apparatus for handling lightweight, flexible bags as received from one machine in a continuous production line and delivered to a second machine in the line, in combination, an elongated stationary plate arranged to receive successive bags in an upright position as delivered from said first machine, and a continuously moving chain conveyor arranged parallel to said stationary plate and having spaced pusher elements extended into the path of the bags and arranged to advance the bags in predetermined spaced relation along said plate and in timed relation to the operation of said second machine, said one machine comprising a bag forming machine from which the bags are discharged in a horizontal position and means for guiding and advancing successive bags to tip downwardly and fall in an upright position on said plate disposed therebelow, said plate and said chain conveyor being supported in parallel relation, said conveyor having an upwardly inclined portion extending from the receiving end to a point intermediate the ends of the conveyor, and having a horizontal portion disposed adjacent said second machine, the receiving end of said conveyor and the intersection of said inclined portion and said horizontal portion being mounted for pivotal adjustment.

7. Apparatus as defined in claim 1 which includes a motor driven line shaft, and drive connections from said line shaft to said first machine, chain conveyor, and said second machine for operating the continuous production line in synchronism.

References Cited

UNITED STATES PATENTS

| 1,893,169 | 1/1933 | Hartmann | 53—183 |
| 3,092,943 | 6/1963 | Paal | 53—183 |
| 3,309,968 | 3/1967 | Scully | 93—44 |

THERON E. CONDON, Primary Examiner

E. P. DESMOND, Assistant Examiner

U.S. Cl. X.R.

93—44.1